(12) United States Patent
Lucidarme et al.

(10) Patent No.: US 8,467,800 B2
(45) Date of Patent: Jun. 18, 2013

(54) METHOD FOR MONITORING RADIO EQUIPMENT FOR COMMUNICATION BETWEEN A MOBILE TERMINAL AND A CELLULAR INFRASTRUCTURE WITH SPREAD SPECTRUM AND ARRANGEMENT FOR PERFORMING SAID METHOD

(75) Inventors: Thierry Lucidarme, Montigny le Bretonneux (FR); Nidham Ben Rached, Paris (FR); Pierre Roux, Argenteuil (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/086,179

(22) Filed: Apr. 13, 2011

(65) Prior Publication Data

US 2011/0243257 A1    Oct. 6, 2011

Related U.S. Application Data

(63) Continuation of application No. 10/483,119, filed as application No. PCT/FR02/00821 on Mar. 7, 2002, now Pat. No. 7,929,971.

(30) Foreign Application Priority Data

Jul. 5, 2001   (FR) ...................................... 01 08951
Nov. 15, 2001  (WO) ........................ PCT/FR01/03580

(51) Int. Cl.
*H04W 72/00* (2009.01)

(52) U.S. Cl.
USPC ..... 455/450; 455/451; 455/452.1; 455/452.2; 455/509; 370/348; 370/349; 370/443

(58) Field of Classification Search
USPC ........ 455/67.11, 269, 272, 450, 452.1–452.2, 455/453–454, 500, 509, 517, 464, 504–506, 455/451; 375/130; 370/348–349, 443
See application file for complete search history.

(56) References Cited

U.S. PATENT DOCUMENTS

| | | | |
|---|---|---|---|
| 6,073,021 A | 6/2000 | Kumar et al. | |
| 6,370,183 B1 * | 4/2002 | Newson et al. | 375/144 |

(Continued)

FOREIGN PATENT DOCUMENTS

| | | |
|---|---|---|
| WO | WO 99/13675 | 3/1999 |
| WO | WO 00/38456 | 6/2000 |

(Continued)

OTHER PUBLICATIONS

TS 25.401, "UTRAN Overall Description," version 3.1.0 published in Jan. 2000 by the 3GPP.

(Continued)

*Primary Examiner* — Wayne Cai
(74) *Attorney, Agent, or Firm* — Meyertons, Hood, Kivlin, Kowert & Goetzel, P.C.

(57) ABSTRACT

Parameters for the propagation channels between each mobile terminal (14, 14A, 14B) and several fixed transceivers (13) are measured and a report message transmitted to a radio network controller (12), indicating at least one part of the measured parameters. The radio network controller processes the report messages. The parameters measured for each fixed transceiver are a propagation profile, including at least one propagation path associated with a reception energy and the parameters given in the report messages for at least one transceiver, comprise data on the energetic distribution in the propagation profile, taken into account by the radio network controller in processing.

32 Claims, 7 Drawing Sheets

U.S. PATENT DOCUMENTS

| | | | |
|---|---|---|---|
| 6,385,183 | B1 | 5/2002 | Takeo |
| 6,625,202 | B1 | 9/2003 | Sudo et al. |
| 6,728,264 | B1 | 4/2004 | Kumagai et al. |
| 6,782,035 | B1 | 8/2004 | Nakamura et al. |
| 2002/0141478 | A1 | 10/2002 | Ozluturk et al. |
| 2005/0208961 | A1 | 9/2005 | Willenegger |

FOREIGN PATENT DOCUMENTS

| | | |
|---|---|---|
| WO | WO 00/76251 | 12/2000 |
| WO | WO 01/18991 | 3/2001 |
| WO | WO 01/41382 | 6/2001 |

OTHER PUBLICATIONS

TS 25.301, "Radio Interface Protocol," version 3.4.0 published in Mar. 2000 by the 3GPP (3rd Generation Partnership Project).

TS 25.213, "Spreading and modulation (FDD)," version 3.2.0 published in Mar. 2000 by the 3GPP.

TS 25.211, "Physical channels and mapping of transport channels onto physical channels (FDD)," version 3.3.0 published in Jun. 2000 by the 3GPP.

TS 25.212, "Multiplexing and channel coding (FDD)," version 3.3.0 published in Jun. 2000 by the 3GPP.

TS 25.215, "Physical layer—Measurements (FDD)," version 3.3.0 published in Jun. 2000 by the 3GPP.

TS 25.214, "Physical Layer procedures (FDD)," version 3.6.0, published in Mar. 2001 by the 3GPP.

TS 25.331, "RRC Protocol Specification," version 4.1.0 published in Jun. 2001 by the 3GPP.

TS 25.433, version 4.1.0, "UTRAN lub Interface NBAP Signalling," published in Jun. 2001 by the 3GPP.

International Search Report for PCT International Application No. PCT/FR01/03580 mailed Mar. 18, 2002.

International Search Report for PCT International Application No. PCT/FR02/00821, mailed Jun. 24, 2002.

* cited by examiner

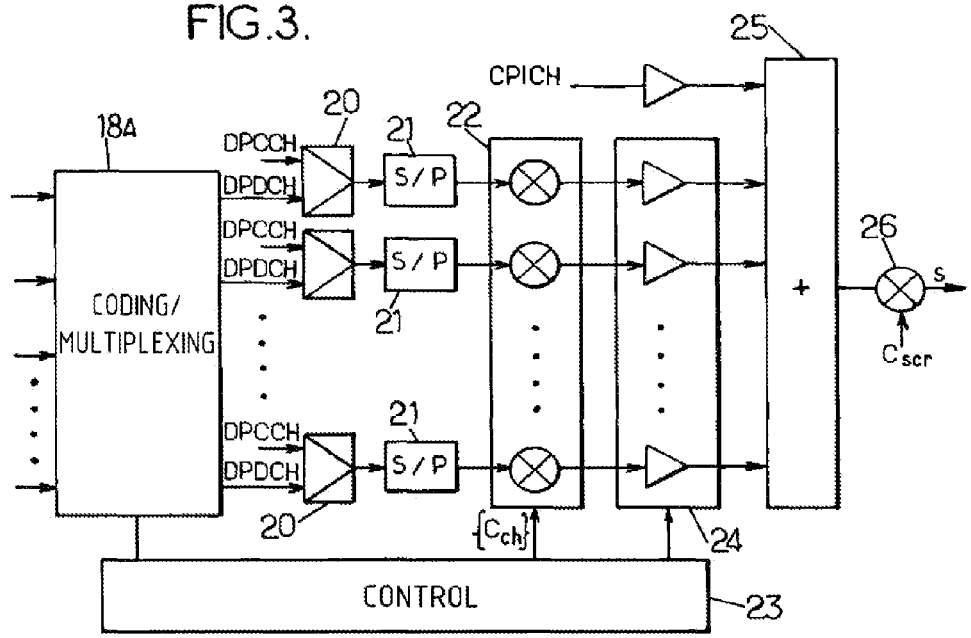
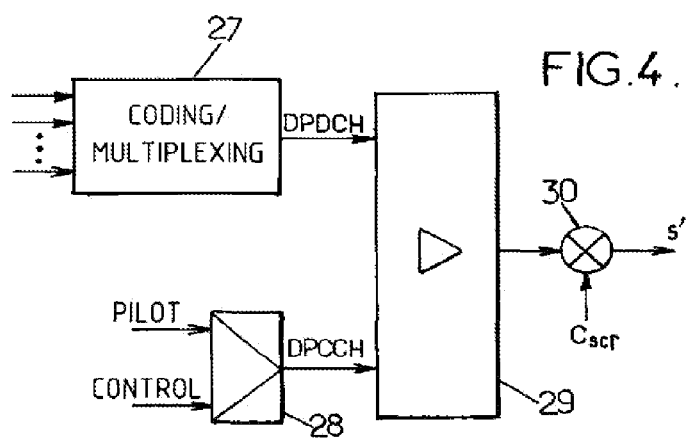

METHOD FOR MONITORING RADIO EQUIPMENT FOR COMMUNICATION BETWEEN A MOBILE TERMINAL AND A CELLULAR INFRASTRUCTURE WITH SPREAD SPECTRUM AND ARRANGEMENT FOR PERFORMING SAID METHOD

PRIORITY CLAIMS

This application is a continuation of prior pending U.S. patent application Ser. No. 10/483,119 filed Jan. 5, 2004 entitled "METHOD FOR MONITORING RADIO EQUIPMENT FOR COMMUNICATION BETWEEN A MOBILE TERMINAL AND A CELLULAR INFRASTRUCTURE WITH SPECTRUM DISPERSION AND ARRANGEMENT FOR PERFORMING SAID METHOD", which is a 371(c) filing of PCT International Application No. PCT/FR2002/000821 filed Mar. 7, 2002 entitled "METHOD FOR MONITORING RADIO EQUIPMENT FOR COMMUNICATION BETWEEN A MOBILE TERMINAL AND A CELLULAR INFRASTRUCTURE WITH SPREAD SPECTRUM AND ARRANGEMENT FOR PERFORMING SAID METHOD" which claims priority to PCT International Application No. PCT/FR2001/003580 filed Nov. 15, 2001 and to French Patent Application No. 01/08951 filed Jul. 5, 2001, all of which are hereby incorporated herein by reference in their entireties for all purposes. Any disclaimer that may have occurred during prosecution of the above-referenced application(s) is hereby expressly rescinded.

BACKGROUND OF THE INVENTION

The present invention concerns the field of digital radio-communications with spread spectrum. It finds its application mainly in cellular networks using code division multiple access (CDMA) methods, for example in third generation networks of the universal mobile telecommunication system (UMTS) type.

The particular feature of spread spectrum techniques is to enable account to be taken of multiple propagation paths between the transmitter and the receiver, which generates an appreciable gain in reception diversity.

A receiver conventionally used for this is the rake receiver which comprises a certain number of "fingers" operating in parallel to estimate the digital symbols transmitted. The gain in reception diversity results from combining the estimates obtained in the different fingers of the receiver.

In a spread spectrum CDMA system, the symbols transmitted, usually binary (±1) or quaternary (±1±j), are multiplied by spreading codes composed of samples, called "chips", the rate of which is greater than that of the symbols, in a ratio called the spread factor. Orthogonal or quasi-orthogonal spreading codes are allocated to different channels sharing the same carrier frequency in order to allow each receiver to detect the sequence of symbols intended for it, by multiplying the received signal by the corresponding spreading code.

The conventional rake receiver carries out a coherent demodulation based on an approximation of the impulse response of the radio propagation channel by a series of peaks, each peak appearing with a delay corresponding to the propagation time throughout the length of a particular path and having a complex amplitude corresponding to the attenuation and to the signal phase shift throughout the length of that path (instantaneous realization of fading). By analyzing several reception paths, that is by sampling on several occasions the output of a filter matched to the channel's spreading code, with delays corresponding respectively to those paths, the rake receiver obtains multiple estimates of the transmitted symbols, which are combined to obtain a gain in diversity. The combination can mainly be effected according to the method known as "maximum ratio combining" (MRC) which weights the different estimates according to the complex amplitudes observed for the different paths. To enable this coherent demodulation, pilot symbols can be transmitted with the information symbols for the estimate of the impulse response in the form of a succession of peaks.

Usually, in cellular systems, the fixed transceiver serving a given cell also transmits a marker signal on a pilot channel to which is allocated a determined pilot spreading code. This pilot code is communicated to the mobile terminals located in the cell or nearby, by means of system information transmitted by the base stations. The terminals take measurements of the power received on the pertinent pilot codes. These measurements enable mobiles on standby to identify the best cell to use if they have to make a random access. They also are used to identify, during a communication, the cell or cells with which the radio link conditions are the best for making an intercell communication transfer ("handover") if necessary.

Another particular feature of spread spectrum CDMA systems is the ability to support a macrodiversity mode. Macrodiversity consists in envisaging that a mobile terminal can simultaneously communicate with distinct fixed transceivers of an active set. In the downlink direction, the mobile terminal receives the same information several times. In the uplink direction, the radio signal transmitted by the mobile terminal is captured by the fixed transceivers of the active set to form different estimates subsequently combined in the network.

Macrodiversity procures a reception gain which improves the performance of the system by combining different observations of the same information.

It is also used to perform soft handovers (SHO) when the mobile terminal moves.

The macrodiversity mode leads, in the rake receiver of the mobile terminal, to assigning the fingers allocated to a communication to paths belonging to different propagation channels from several fixed transceivers and usually having different spreading codes.

On the network side, the macrodiversity mode implements a kind of macroscopic rake receiver, the fingers of which are located in different transceivers. The estimates are combined after channel decoding in a base station if the base station groups together all the transceivers concerned, or if not, in a controller supervising the base stations.

The macrodiversity mode imposes a certain signaling load in the network when the active set relating to a terminal must be updated. Furthermore, it mobilizes supplementary transmission and reception resources in the base stations, as well as some bandwidth for the transfer of the data to be combined in the network. It is therefore judicious to use it only when the reception gain obtained is significant.

This reception gain comes principally from the multiplicity of propagation paths taken into consideration. There are many cases in which a propagation channel (or a small number of such channels) have sufficiently numerous paths that the addition of one or more supplementary transceivers to the active set procures only a weak gain in terms of bit error ratio (BER), even though the reception conditions are correct on the propagation channels between the terminal and these supplementary transceivers. In such a case, the macrodiversity links load the network to no great purpose.

In a CDMA system such as the UMTS, the transmit power over the radio interface is adjusted through a feedback control procedure in which the receiver returns power control commands (TPC) to the transmitter to try to achieve an objective in terms of reception conditions. These TPC commands consist of bits transmitted at a fairly high rate and their value indicates whether the transmit power should be increased or reduced.

In the case of a communication in macrodiversity, the different fixed transceivers of the active set receive identical TPC bits from the mobile terminal. Respective corrective terms can be taken into account by these fixed transceivers to balance the transmitted powers. For a given active set, if a first transceiver generates a large number of propagation paths whereas a second generates only a small number of paths, it may be preferable to aim for a higher power set-point value for the first transceiver than for the second. Otherwise, it may happen that the gain in macrodiversity brought about by adding the second transceiver to the active set is negative.

Since the chip rate is fixed, a high rate physical channel has a low spread factor and a short symbol duration. If the impulse response of this channel comprises paths that are relatively widely spaced over time, the result is inter-symbol interference which degrades the performance of the receiver or requires a channel equalizer which greatly increases its complexity. It may therefore be advantageous to divide such a channel into two channels of double the spread factor. However, the multiplication of channels with high spread factors is not always desirable, so it is better to dispense therewith when the channel generates almost no inter-symbol interference.

An object of the present invention is to optimize the use of the resources in a radio network with spread spectrum.

SUMMARY OF THE INVENTION

So the invention proposes a method of controlling radio resources assigned to a communication between a mobile terminal and a cellular radio network infrastructure with spread spectrum, the infrastructure comprising at least one radio network controller and fixed transceivers serving respective cells. This method comprises the following steps:
  measurement of respective propagation channel parameters between the mobile terminal and several fixed transceivers, the measurements comprising the determination, for each fixed transceiver, of a propagation profile including at least one propagation path associated with a respective reception energy;
  transmission to the radio network controller of report messages indicating at least one part of the measured parameters;
  processing of the report messages at the radio network controller.

The parameters indicated in the report messages for at least one fixed transceiver comprise data dependent on the energy distribution in the propagation profile, taken into account by the radio network controller in said processing.

The processing of the report messages for the radio network controller may comprise a macrodiversity control, that is the determination of an active set of fixed transceivers relative to the terminal and an activation of the radio link between the mobile terminal and each fixed transceiver of the active set.

Consequently, the algorithm of active set management and handover control executed in the radio network controller is not limited to examining the global reception energies on the different propagation channels as in conventional systems. It also has information on the energy distributions in the propagation profiles, which enables it better to assess the need to add fixed transceivers to or remove them from the active set.

Analogous considerations may apply to other radio resource control procedures, particularly to the algorithm for transmission power management of the transceivers of the active set and for power control executed in the radio network controller. In this case, the propagation profiles enable the radio network controller better to assess the need to increase or reduce the transmission power of the transceivers of the active set.

The data dependent on the energy distribution in the propagation profile and transmitted to the radio network controller may notably comprise a number of propagation paths detected between the mobile terminal and the fixed transceiver with a reception energy greater than a threshold. For example, if a propagation channel has of itself a sufficiently large number of energetic paths, the controller may inhibit the addition of supplementary transceivers to the active set or at least make the addition conditions more severe. In another example, if two transceivers are part of the active set and if each of them has a predominant energetic path with a comparable attenuation (pathloss), the controller can balance their transmission powers so that they are equivalent.

Similarly, the data dependent on the energy distribution in the propagation profile may give an indication on the distribution of energetic paths over time. In this case, another example of processing report messages for the radio controller is to obtain the time shift between the main paths, that is the most energetic paths, on the propagation channel and to compare it with the duration of a symbol on the physical channel or channels involved in the communication between the mobile terminal and a fixed transceiver. The radio controller can then decide to configure the mobile terminal and the fixed transceiver so that they use other physical channels with a format more suited to the situation with a view to establishing a good compromise between any inter-symbol interference and a maximum bit rate for the communication.

The data dependent on the energy distribution in the propagation profile and transmitted to the radio network controller may also comprise the values of the reception energies respectively associated with one or more propagation paths detected between the mobile terminal and the fixed transceiver.

The measurements of the propagation channel parameters, or at least some of them, can be downlink measurements taken by the mobile terminal on pilot signals respectively transmitted by the fixed transceivers and formed with determined spreading codes. Some of these measurements may also be uplink measurements taken by the fixed transceivers on a pilot signal included in signals transmitted by the mobile terminal over a dedicated channel.

The invention also proposes radio network controllers, mobile terminals and base stations suitable for the implementation of the above method.

A radio network controller according to the invention, for a cellular radio network infrastructure with spread spectrum, comprising means of communicating with fixed transceivers serving respective cells and with at least one mobile terminal and means of controlling radio resources assigned to a communication between the mobile terminal and the cellular network infrastructure. The means of radio resource control comprise means for requesting, via the communication means, report messages of measurements of respective propagation channel parameters between the mobile terminal and several fixed transceivers, the measurements comprising the determination, for each fixed transceiver, of a propagation profile including at least one propagation path associated with a respective reception energy, means of processing the report messages. The parameters indicated in the report messages for at least one fixed transceiver comprise data dependent on the energy distribution in the propagation profile, taken into account by processing means.

A radiocommunication mobile terminal with spread spectrum according to the invention comprises:
- a radio interface for communicating with a cellular network infrastructure comprising at least one radio network controller and fixed transceivers serving respective cells;
- means of measuring respective propagation channel parameters from several fixed transceivers, disposed to determine a propagation profile for each of said fixed transceivers on the basis of pilot signals respectively transmitted by said fixed transceivers, each propagation profile including at least one propagation path associated with a respective reception energy; and
- means of transmitting to the radio network controller report messages indicating at least part of the measured parameters including, for at least one fixed transceiver, data dependent on the energy distribution in the propagation profile.

A base station according to the invention, for a cellular radio network infrastructure with spread spectrum, comprising at least one radio transceiver serving a respective cell, and means of communicating with at least one radio network controller of the cellular network infrastructure. Each radio transceiver comprises means of measuring parameters of a propagation channel from a mobile terminal in communication with the cellular network infrastructure, disposed to determine a propagation profile on the basis of a pilot signal included in signals transmitted by the mobile terminal over a dedicated channel, the propagation profile including at least one propagation path associated with a respective reception energy and where necessary with the combination of several reception energies relative to the same path when several receivers are used simultaneously. The means of communicating with the radio network controller comprise means of transmitting report messages indicating at least a part of the measured parameters, including data dependent on the energy distribution in the propagation profile.

BRIEF DESCRIPTION OF THE DRAWINGS

FIG. 3 is a block diagram of the transmission part of a radio transceiver of a UMTS base station;
FIG. 4 is a block diagram of the transmission part of a UMTS mobile terminal.

DESCRIPTION OF PREFERRED EMBODIMENTS

Figure 1:
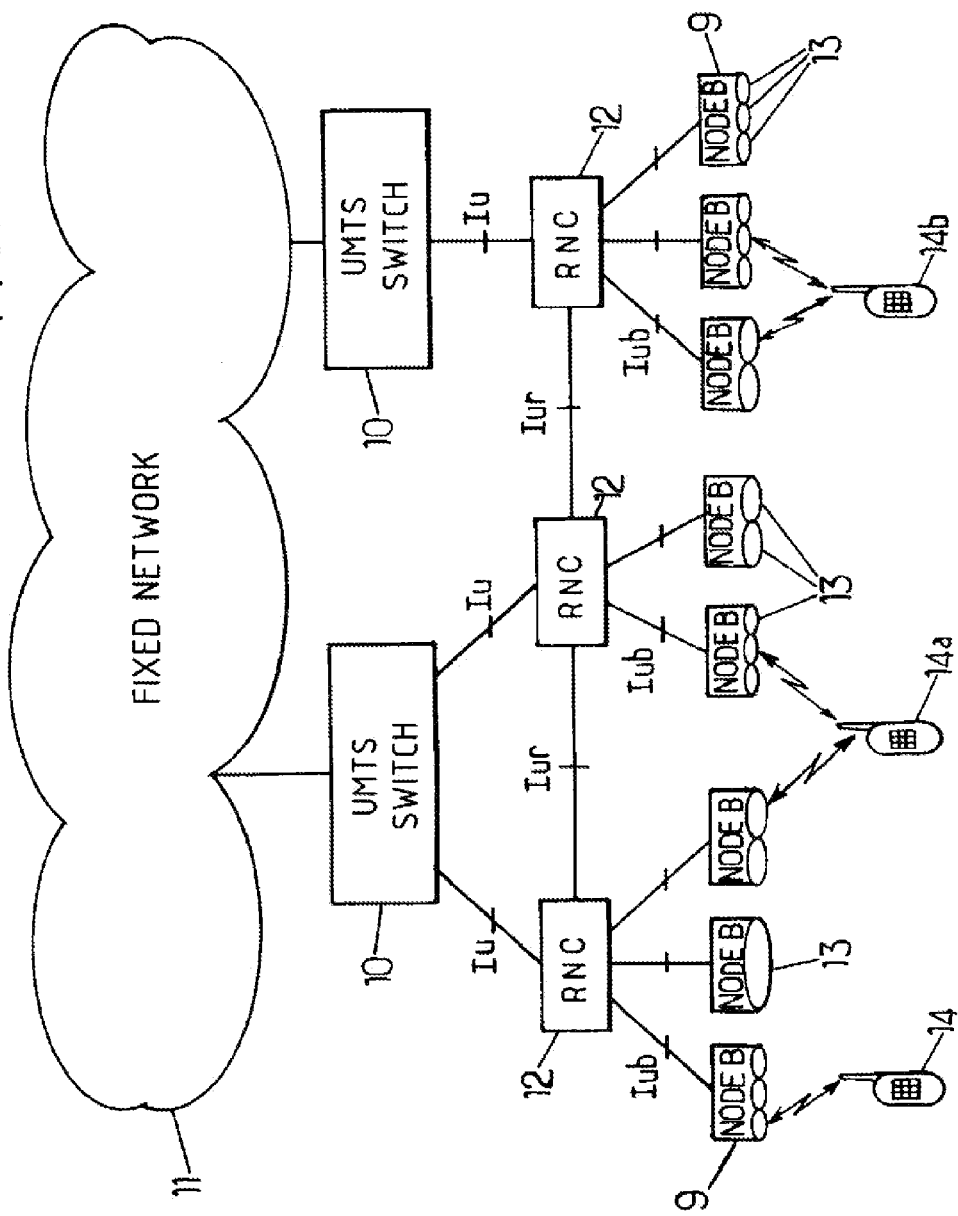
FIG. 1 is a diagram of a UMTS network.

The invention is described below in its application to a UMTS network, the architecture of which is shown in FIG. 1.

The switches of the mobile service 10, belonging to a core network (CN), are linked on the one hand to one or more fixed networks 11 and on the other hand, by means of an interface known as Iu, to control equipments 12, or radio network controllers (RNC). Each RNC 12 is linked to one or more base stations 9 by means of an interface known as Iub. The base stations 9, distributed over the network's coverage territory, are capable of communicating by radio with the mobile terminals 14, 14a, 14b called user equipment (UE). The base stations 9, also called "node B", may each serve one or more cells by means of respective transceivers 13. Certain RNCs 12 can also communicate with one another by means of an interface known as Iur. The RNCs and the base stations form an access network known as a "UMTS terrestrial access network" (UTRAN).

The UTRAN comprises elements of layers 1 and 2 of the ISO model in order to provide the links required on the radio interface (called Uu), and a radio resource control stage 15A (RRC) belonging to layer 3, as is described in technical specification 3G TS 25.301, "Radio Interface Protocol", version 3.4.0 published in March 2000 by the 3GPP (3rd Generation Partnership Project). Seen from the upper layers, the UTRAN simply acts as a relay between the UE and the CN.

Figure 2:
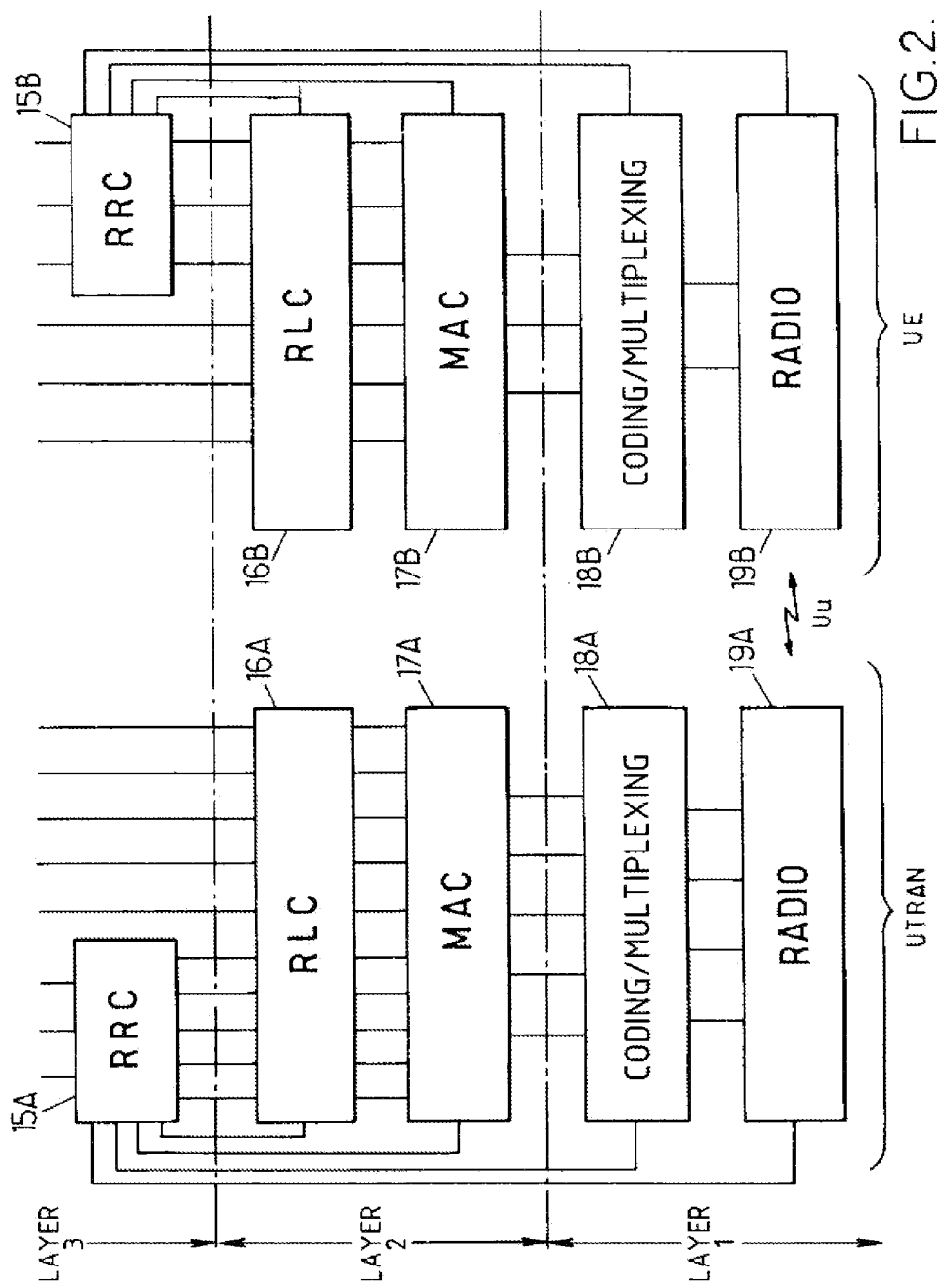
FIG. 2 is a diagram showing the organization in layers of communication protocols employed on the radio interface of the UMTS network.

FIG. 2 shows the RRC stages 15A, 15B and the stages of the lower layers which belong to the UTRAN and to a UE. On each side, layer 2 is subdivided into a stage 16A, 16B of radio link control (RLC) and a stage 17A, 17B of medium access control (MAC). Layer 1 comprises a stage 18A, 18B of encoding and multiplexing. A radio stage 19A, 19B transmits the radio signals based on a stream of symbols supplied by the stage 18A, 18B, and receives the signals in the other direction.

There are different ways of adapting the architecture of protocols as shown in FIG. 2 to the hardware architecture of the UTRAN as shown in FIG. 1, and different organizations can usually be adopted to suit the types of channels (see section 11.2 of technical specification 3G TS 25.401, "UTRAN Overall Description", version 3.1.0 published in January 2000 by the 3GPP). The RRC, RLC and MAC stages are in the RNC 12. Layer 1 is for example in the node B 9. A part of this layer may however be in the RNC 12.

When several RNCs are involved in a communication with a UE, there is usually a serving RNC, called SRNC, which contains the modules pertaining to layer 2 (RLC and MAC) and at least one drift RNC, called DRNC, to which is linked a base station 9 with which the UE is in radio contact. Appropriate protocols perform the interchanges between these RNCs over the Iur interface, for example ATM ("Asynchronous Transfer Mode") and AAL2 ("ATM Adaptation Layer No. 2"). These same protocols may also be employed over the Iub interface for the interchanges between a node B and its RNC.

Layers 1 and 2 are each controlled by the sublayer RRC, the features of which are described in technical specification TS 25.331, "RRC Protocol Specification", version 4.1.0 published in June 2001 by the 3GPP. The RRC stage 15A, 15B monitors the radio interface. It also processes streams to be transmitted to the remote station according to a "control plan", as opposed to the "user plan" which is for processing the user data from layer 3.

The UMTS uses the CDMA spread spectrum technique, meaning that the symbols transmitted are multiplied by spreading codes consisting of samples called "chips" the rate of which (3.84 Mchip/s in the case of the UMTS) is greater than that of the symbols transmitted. The spreading codes distinguish different physical channels (PhCH) which are superimposed on the same transmission resource consisting of a carrier frequency. The auto- and cross-correlation properties of the spreading codes allow the receiver to separate the PhCHs and to extract the symbols that are sent to it.

For the UMTS in FDD ("Frequency Division Duplex") mode, on the downlink, a scrambling code is allocated to each transceiver 13 of each base station 9 and different physical channels used by that transceiver are distinguished by mutually orthogonal channelization codes. The transceiver 13 can also use several mutually orthogonal scrambling codes, one of them being a primary scrambling code. On the uplink, the transceiver uses the scrambling code to separate the transmitting UEs, and where appropriate the channelization code to separate the physical channels from one and the same UE. For each PhCH, the global spreading code is the product of the channelization code and the scrambling code. The spread factor (equal to the ratio between the chip rate and the symbol rate) is a power of 2 lying between 4 and 512. This factor is chosen according to the symbol rate to be transmitted over the PhCH.

The various physical channels are organized into frames of 10 ms which succeed one another on the carrier frequency used. Each frame is subdivided into 15 time slots of 666 µs. Each time slot can carry the superimposed contributions of one or more physical channels, comprising common channels and dedicated physical channels (DPCH).

On the downlink, one of the common channels is a pilot channel called common pilot channel (CPICH). This channel carries a pilot signal, or marker signal, formed on the basis of a predetermined sequence of symbols (see technical specification 3G TS 25.211, "Physical channels and mapping of transport channels onto physical channels (FDD)", version 3.3.0 published in June 2000 by the 3GPP). This signal is transmitted by the transceiver 13 on the primary scrambling code of the cell, with a determined channelization code.

FIG. 3 illustrates schematically the transmission part of a fixed transceiver 13 of a UMTS base station, serving a cell by means of a scrambling code $c_{scr}$. Layer 1 can multiplex Several transport channels (TrCH) from the MAC sublayer onto one or more PhCHs. The module 18A receives the data streams of the downlink TrCHs, from the RNC, and applies to them the coding and multiplexing operations required to form the data part (DPDCH) of the DPCHs to be transmitted. These coding and multiplexing functions are described in detail in technical specification 3G TS 25.212, "Multiplexing and channel coding (FDD)", version 3.3.0 published in June 2000 by the 3GPP.

This data part DPDCH is multiplexed over time, within each 666 ms time slot with a control part (DPCCH) comprising control information and predetermined pilot symbols, as shown diagrammatically in FIG. 3 by the multiplexers 20 which form the bit streams of the DPCHs. On each channel, a serial/parallel converter 21 forms a complex digital signal the real part of which consists of the bits of even rank of the stream and the imaginary part of which consists of the bits of odd rank. The module 22 applies to these complex signals their respective channelization codes $c_{ch}$, which are allocated by a control unit 23. The module 24 weights the resultant signals according to the respective transmission powers of the physical channels, determined by a power control process.

The complex signals of the different channels are then summed by the adder 25 before being multiplied by the scrambling code $c_{scr}$ of the cell by means of the module 26. The adder 25 also receives the contribution of the CPICH, which is not multiplied by a channelization code since the channelization coda of the CPICH is constant and equal to 1 (technical specification 3G TS 25.213, "Spreading and modulation (FDD)", version 3.2.0 published in March 2000 by the 3GPP). The baseband complex signal s delivered by the module 26 is subjected to a shaping filter and converted to analog before modulating the carrier frequency in quadrature phase shift keying (QPSK) and being amplified and transmitted by the base station.

The different transmission resources of the transceiver 13 are allocated to the channels by the unit 23 under the control of the RRC stage 15A located in the RNC. The corresponding control messages are transmitted by means of a control application protocol of the transceivers, called NBAP ("Node B Application Protocol", see technical specification 3G TS 25.433, version 4.1.0, "UTRAN Iub Interface NBAP Signalling", published in June 2001 by the 3GPP).

FIG. 4 illustrates schematically the transmission part of a UE. It is assumed here that this UE transmits over a single physical channel. The module 27 performs the coding and where necessary the multiplexing of the corresponding TrCHs to a physical channel. This forms a real signal (DPDCH) which will be transmitted over a channel I. In parallel, control information and pilot symbols are assembled by a module 28 to form a real signal (DPCCH) which will be transmitted over a channel Q. The digital signals of channels I and Q form the real and imaginary parts of a complex signal the transmission power of which is adjusted by a module 29. The resulting signal is modulated by the spreading code of the channel comprising a scrambling code $c_{scr}$, and represented by the multiplier 30. The complex baseband signal s' thus obtained then filtered and converted to analog before modulating the carrier frequency in QPSK.

Figure 5:
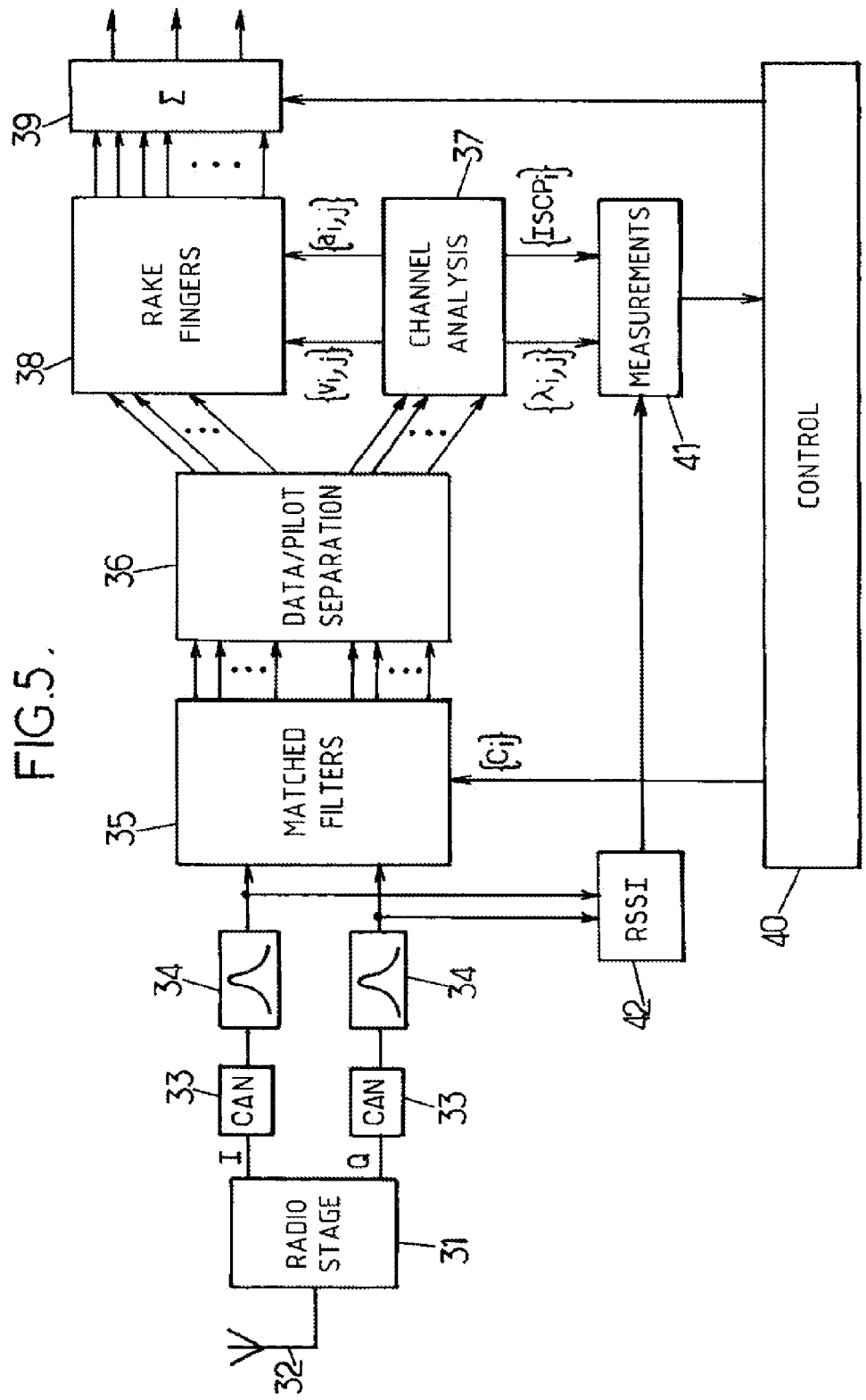
FIG. 5 is a block diagram of a receiver of a UMTS station.

FIG. 5 is a block diagram of a CDMA receiver that may be in the UE for the downlink or in the node B for the uplink. The receiver comprises a radio stage 31 which performs the analog processing required on the radio signal captured by an antenna 32. The radio stage 31 delivers a complex analog signal the real and imaginary parts of which are digitized by the analog-digital converters 33 on respective processing channels I and Q. On each channel, a filter 34 matched to the shaping of the pulses by the transmitter produces a digital signal at the chip rate of the spreading codes.

These digital signals are subject to a bank of matched filters 35. These filters 35 are matched to the spreading codes $c_j$ of the channels to be taken into consideration. These spreading codes $c_j$ (products of a scrambling code and where appropriate a channelization code) are supplied to the matched filters 35 by a control module 40 which manages in particular the allocation of the receiver's resources. On the node B side, the control module 40 is monitored by the RRC stage 15A of the RNC through the NBAP protocol. On the UE side, the control module 40 is monitored by the RRC stage 15B.

For N physical channels (spreading codes) taken into account, the matched filters 35 deliver N real signals on the I channel and N real signals on the Q channel, which are supplied to a module 36 for separation between the data and the pilot signals. For the downlinks, the separation consists in extracting the portions of the time slots containing the complex pilot signals transmitted by the node B to supply them to the channel analysis module 37, the corresponding data being addressed to the fingers 38 of the rake receiver. In the case of the uplinks, the separation performed by the module 36 consists in extracting the real pilot signals from the Q channel relative to each channel to supply them to the analysis module 37.

For each physical channel, denoted by an integer index i, the analysis module 37 identifies a certain number of propagation paths, denoted by an index j, on the basis of the portion of the output signal from the matched filter 35 corresponding to the pilot signals, which constitutes a sampling of the channel's impulse response.

There are various possible ways of representing the propagation paths for the rake receiver. One method consists in finding the maxima of the channel's impulse response sampled at the output of the matched filter 35, averaged over a period of some hundred milliseconds. Each propagation path is then represented by a delay $t_{i,j}$ corresponding to one of the maxima, of instantaneous amplitude $a_{i,j}$. In this case, the processing performed in each finger 38 of the rake receiver, allocated to path j of channel i, consists in sampling the signal received over the channel i with the delay $t_{i,j}$ and multiplying the result by $a_{i,j}^*$. The selected paths are those for which the reception energies are the highest, the reception energy following a path j of a channel i being equal to the average of $|a_{i,j}|^2$.

In another possible representation (see WO01/41382), each propagation path of a channel i is represented by an eigenvector $v_{i,j}$ of the autocorrelation matrix of the impulse response vector supplied by the matched filter 35. In the processing performed in the finger 38 of the rake receiver, sampling with the delay $t_{i,j}$ is then replaced by the scalar product of the output vector of the matched filter 35 times the eigenvector $v_{i,j}$. To estimate the eigenvectors $v_{i,j}$, the analysis module 37 performs a diagonalization of the autocorrelation matrix, which also supplies the associated eigenvalues $\lambda_{i,j}$. The eigenvalue $\lambda_{i,j}$, equal to the mathematical expectation of $|a_{i,j}|^2$, represents the reception energy of the signal on path j of channel i.

The combination module 39 of the rake receiver receives the contributions of the fingers 38 and, for each channel i, calculates the sum of the respective contributions of the retained paths j, indicated by the control module 40. The result is the local estimate of the information symbols transmitted over channel i.

In the case of a UE receiving downlink signals in macrodiversity mode, that is from several transceivers 13 using different spreading codes, the module 39 may also add up the contributions of the corresponding propagation channels to obtain the gain in diversity. The combined estimates that result from this are then submitted to the decoding and demultiplexing stage (not shown in FIG. 5).

In the case of a base station 9 receiving on several transceivers 13 uplink signals from one and the same mobile terminal in macrodiversity mode, the local estimates delivered by the respective combination modules 39 of those transceivers 13 are also combined to obtain the gain in diversity.

In the case of an uplink macrodiversity between several base stations 9 receiving signals from one and the same mobile terminal, the local estimates delivered by the respective combination modules 39 of the transceivers are submitted to the decoding and demultiplexing stage (not shown in FIG. 5) to obtain the estimated symbols of the TrCH or TrCHs concerned. These symbols are transmitted to the SRNC via the Iub (Iur) interface in which they are combined to obtain the gain in diversity.

Figure 6:
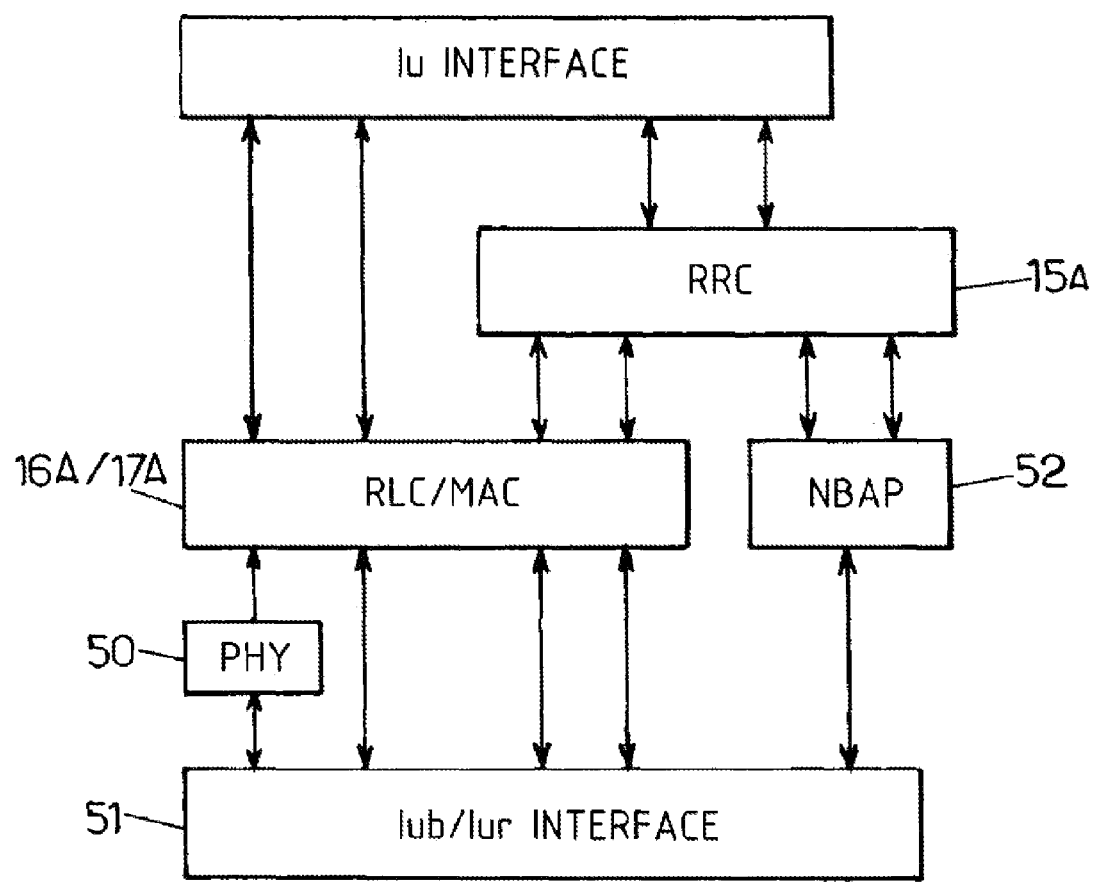
FIG. 6 is a block diagram of a UMTS radio network controller.

The corresponding combination module of the RNC 12 is designated by the reference 50 in FIG. 6. This module retrieves from the Iub and/or Iur interface 51 the symbols of the TrCH from the different base stations and supplies them the MAC stage 17A after combination. In the downlink direction, this module 50 belonging to the physical layer takes responsibility for transmitting the streams of the TrCHs from the MAC stage 17A to the base stations concerned.

FIG. 6 also illustrates schematically an instance 52 of the NBAP protocol executed at the RNC 12 to control a remote base station. The dialog between the RRC stage 15A of the RNC and that 15B of a UE is performed by means of an "RRC connection" managed as described in section 8.1 of technical specification 3G TS 25.331 abovementioned.

The procedures of the RRC protocol comprise measurement procedures described in section 8.4 of technical specification 3G TS 25.331, which serve mainly to update the active set for the UEs in macrodiversity (or SHO) as well as to adjust the transmission powers of the transceivers of the active set. The measurements expected by the RNC are requested from the UEs in "MEASUREMENT CONTROL", messages, in which are also indicated the report modes, for example with a specified periodicity or in response to certain events. The measurements specified by the RNC are then made by the UE which sends them back up on the RRC connection in "MEASUREMENT REPORT" messages (see sections 10.2.17 and 10.2.19 of technical specification 3G TS 25.331). These "MEASUREMENT CONTROL" and "MEASUREMENT REPORT" messages are relayed transparently by the transceivers 13 of the base stations.

Several nonstandardized algorithms can be used by the SRNC to determine the transceivers 13 of the active set. Examples of them will be examined later.

In some cases, these algorithms for determining the active set may take into account uplink measurements, taken by the transceivers 13 of the base stations and sent back up according to the NBAP procedures described in sections 8.3.8 to 8.3.11 of the abovementioned technical specification 3G TS 25.433. The RNC tells the node B the measurements it requires in a "DEDICATED MEASUREMENT INITIATION REQUEST" message and the node B sends them back up in a "DEDICATED MEASUREMENT REPORT" message (see sections 9.1.52 and 9.1.55 of technical specification 3G TS 25.433).

The modifications of the active set are reported to the UE (control module 40 of the receiver) by means of procedures for updating the active set in SHO of the RRC protocol, described in section 8.4 of technical specification 3G TS 25.331 ("ACTIVE SET UPDATE" message in section 10.2.1).

These modifications also give rise to the transmission of signaling from the RNC to the base stations 9 by means of procedures of establishment, addition, reconfiguration and deletion of radio links of the NBAP protocol, described in section 8 of technical specification 3G TS 25.433.

The measurements taken into consideration by the RNC to control the radio links in SHO comprise power measurements taken on the pilot channels or signals, obtained by a measurement module 41 shown in FIG. 5. Various measurements which the mobile terminals and base stations should be able to take are listed in technical specification 3G TS 25.215, "Physical layer—Measurements (FDD)", version 3.3.0 published in June 2000 by the 3GPP. The measurements obtained by the module 41 are transmitted to the RNC via the control module 40 and the RRC connection (measurement of the UE) or the NEAP protocol (measurement of the node B).

For a given channel i, the sum of the eigenvalues $\lambda_{i,j}$, determined by the analysis module 37 for the p propagation paths taken into consideration ($1 \leq j \leq p$), represents the global energy received on the channel, reduced to the duration of a symbol. This energy is called RSCP ("Received Signal Code Power") in the standard. The analysis module 37 also determines, for each channel i, the residual noise power after taking into account the p paths. This residual power is called ISCP in the standard ("Interference Signal Code Power"). The quantity (RSCP/ISCP)×(SF/2) represents the signal-to-interferer ratio (SIR) for a downlink channel, SF designating the channel's spread factor. The SIR equals (RSCP/ISCP)× SF for an uplink channel.

The SIR, evaluated on the pilot symbols transmitted over a dedicated channel, is a measurement that the RNC may request from the UE or from the node B, and it may, where appropriate, take account of it in the management of the active set.

The radio receiver is also capable of measuring the received power in the bandwidth of the signals around a UMTS carrier. This power, measured by a module 42 upstream of the matched filters 35, is indicated by the quantity called RSSI ("Received Signal Strength Indicator").

The UEs in communication monitor in parallel the energies received over the CPICH channels of the cells belonging to a monitored set comprising the active set and a certain number of neighboring cells. These energy measurements are usually uploaded to the RNC in the "MEASUREMENT REPORT" messages. The quantities uploaded may be the absolute energies (CPICH_RSCP) or, more usually, standardized in relation to the energy of the received signal (CPICH_Ec/N0=CPICH_RSCP/RSSI).

To enable a more detailed consideration of the propagation profiles by the algorithms for active set determination and power control for this active set, it is advantageous also to transmit to the RNC data dependent on the energy distribution in the propagation profile. For this, particular value choices are provided in the "INTRA-FREQUENCY MEASUREMENT" and "MEASURED RESULTS" information elements (IE) of the abovementioned "MEASUREMENT CONTROL" and "MEASUREMENT REPORT" messages of the RRC protocol for the downlink measurements and in the "DEDICATED MEASUREMENT TYPE" and "DEDICATED MEASUREMENT VALUE" IEs of the abovementioned "DEDICATED MEASUREMENT INITIATION REQUEST" and "DEDICATED MEASUREMENT REPORT" messages of the NBAP protocol for the uplink measurements.

The analysis module 37 of the receiver calculates the eigenvalues $\lambda_{i,j}=E(|a_{i,j}|^2)$, which are summed over the path index j to obtain the RSCP of channel i. It therefore has information on the energy distribution in the propagation profile relative to channel i.

The measurement module 41 can retrieve the p values $\lambda_{i,j}$ and transmit them to the RNC 12. In a typical embodiment, the physical channels concerned will be the CPICHs from the transceivers of the monitored set, the measurements being uploaded by the UE. The uploaded measurements may be the absolute measurements $\lambda_{i,j}$, homogeneous to the CPICH_RSCP, or standardized measurements $\mu_{i,j}=\lambda_{i,j}/RSSI$, homogeneous to the CPICH_Ec/N0. The measurement module 41 may also, after having identified the main path, that is the one of which the energy is maximal $\lambda_{i\ max}$, transmit the values of the other paths relative to that main path, that is $\rho_{i,j}=\lambda_{i,j}/\lambda_{i\ max}$.

However, it should be noted that the uploaded measurements may also be of the mono-path SIR type, that is proportional to $\lambda_{i,j}/ISCP_i$, and evaluated on the pilot symbols included in the dedicated channels. Furthermore, the measurements dependent on the energy distribution in the propagation profile may also be measurements taken by the Node B on the pilot symbols transmitted by the UE over the channel Q.

As a variant, the measurement module 41 may transmit only the values $\lambda_{i,j}$, $\mu_{i,j}$ or $\rho_{i,j}$ which exceed a predefined threshold. This threshold is advantageously a parameter that can be adjusted according to a configuration command received from the RNC.

Another possibility is for the receiver simply to indicate to the RNC how many paths j give rise to a reception energy $\lambda_{i,j}$, $\mu_{i,j}$ or $\rho_{i,j}$ greater than the threshold. This number $\alpha_i$, which is a measurement of the multipath diversity procured by a single transceiver 13 for the UE in question, may then be taken into account by the algorithm for determining and controlling the power of the active set.

It is also possible for the receiver to upload to the RNC an indication of relative time position for the different paths identified on a channel i. This may involve, for example, the delay $t_{i,j}$ of each path j, which gives a complete view of the distribution of the paths over a period of time. It may also involve the difference between the detection times of two given paths at the receiver. Again, the two paths taken into account for calculating the time difference to be uploaded to the RNC may be chosen according to different criteria: paths with a reception energy $\lambda_{i,j}$, $\mu_{i,j}$ or $\rho_{i,j}$ greater than a threshold (typically the receiver will upload to the RNC the maximum time difference between two such paths), paths of greatest energy out of all the paths detected over a fixed period, any pair of consecutive paths, the first path detected (serving as a time reference) and any second path etc.

In the case of a cell for which the base station 9 receives on several antennae indices k (k=1, 2, etc.) uplink signals from one and the same mobile terminal, in space diversity mode, the measurement module 41 can transmit to the RNC 12 the values corresponding to reception energies $\lambda_{i,j}$ calculated by summing the values $\lambda_{i,j;k}$ obtained, in the manner previously described, based on the signals respectively captured by the different antennae. This combination is facilitated by the fact that the delays identifying a path j received by the different antennae are substantially identical, considering the short distance usually separating these antennae.

To give just one example from those that have been described above, the value $\rho_{i,j}=\lambda_{i,j}/\lambda_{i\ max}$ transmitted to the RNC 12 may then be replaced by the value $\rho_{i,j}=(\lambda_{i,j;1}+\lambda_{i,j;2})/(\lambda_{i;1}+\lambda_{i;2})_{max}$, in a case of space diversity with two receive antennae of indices k=1 and k=2.

Figure 7:
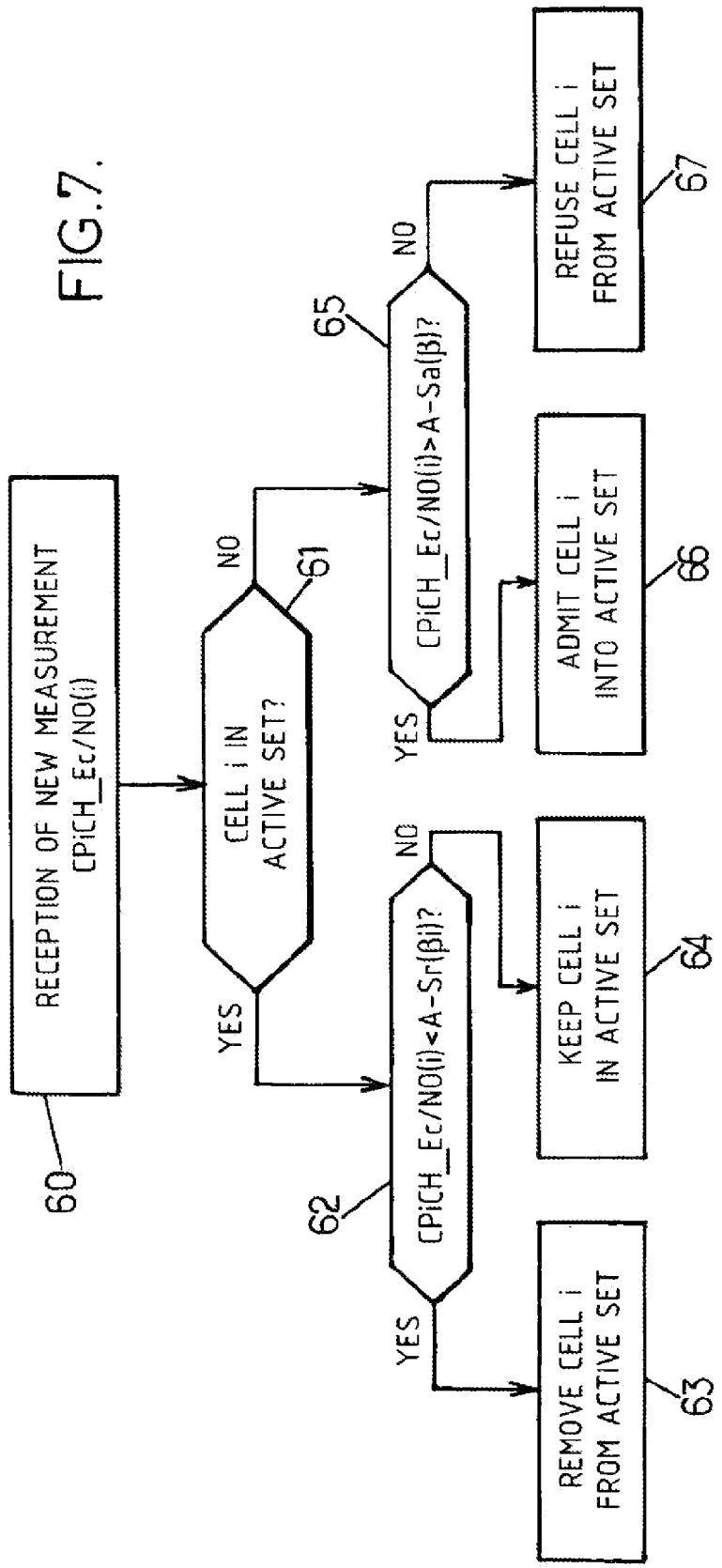
FIGS. 7 and 8 are flowcharts of algorithms for active set determination that can be executed in a radio network controller as shown in FIG. 6.

FIG. 7 gives a simple example of a procedure for determination of the active set by the RRC stage 15A in the RNC 12. This procedure is executed for a given UE when the RNC, having the measurement CPICH_Ec/N0=A relative to a reference cell of the active set for which the CPICH_Ec/N0 or the SIR is maximal, receives a new CPICH_Ec/N0(i) value measured by the UE from a transceiver i of the monitored set (step 60).

If the transceiver i is already in the active set EA (test 61), the RNC examines a criterion for deletion of the transceiver from the active set relative to the UE. This deletion criterion 62 relates to the global reception energy according to the propagation channel between the mobile terminal and transceiver i, expressed by the quantity CPICH_Ec/N0(i), and it has a decreasing severity with the number $\beta_i$ of propagation paths detected by the UE from the other transceivers i' of the active set EA with a reception energy greater than a threshold $$\left(\beta_i = \sum_{\substack{i' \in EA \\ i' \neq i}} \alpha_{i'}\right).$$

Thus, the cell i will have more chances of being removed from the active set when the number of energetic paths already procured by the other propagation channels of the active set is relatively high. In the example in FIG. 7, examination of the criterion 62 consists in comparing the difference A−CPICH_EC/N0(i) with a positive rejection threshold Sr which is a decreasing function of the number $\beta_i$. The cell i is removed from the active set (step 63) when A−CPICH_EC/N0(i)>Sr and is retained otherwise (step 64).

If the transceiver i is not in the active set EA (test 61), the RNC examines a criterion for admission of the transceiver into the active set relative to the UE. This admission criterion

65 also relates to the quantity CPICH_Ec/N0(i) and has an increasing severity with the number β of propagation paths detected by the UE from the transceivers i' of the active set EA with a reception energy greater than a threshold $$\left(\beta_i = \sum_{i' \in EA} \alpha_{i'}\right).$$

Thus, the cell i will have fewer chances of being admitted to the active set when the number of energetic paths already procured by the propagation channels of the active set is relatively high. In the example in FIG. 7, examination of the criterion 65 consists in comparing the difference A−CPICH_EC/N0(i) with a positive admission threshold Sa which is an increasing function of the number β. The cell i is removed from the active set (step 66) when A−CPICH_EC/N0(i)<Sa and is retained otherwise (step 67).

Figure 8:
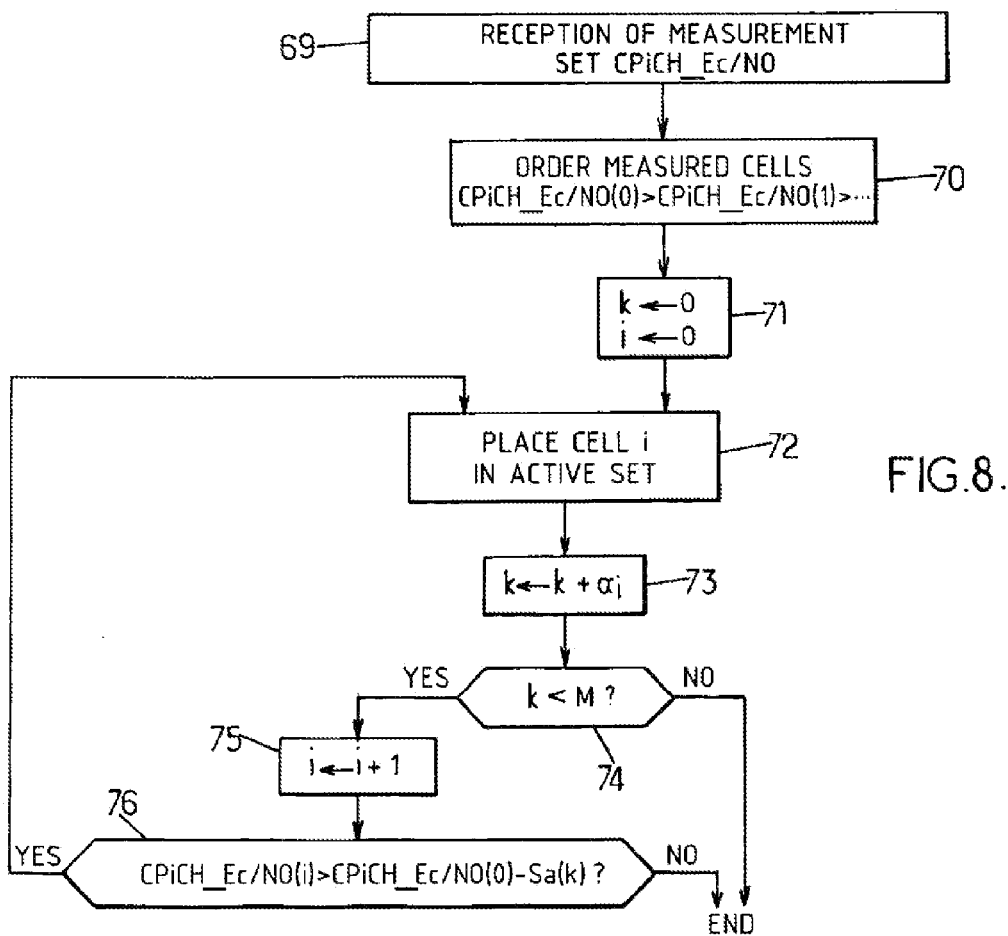

FIG. 8 illustrates another example of a procedure for determining the active set by the RRC stage 15A in the RNC 12. This procedure is executed for a given UE when the RNC receives a new suite of values CPICH_Ec/N0 measured by the UE from the transceivers of the monitored set (step 69). The cells for which these values have been obtained are first placed in the order of decreasing CPICH_Ec/N0 (step 70) and the integer variables k and i are initialized to zero (step 71).

The integer i serves to index a loop 72-76 the first step of which 72 consists in placing the cell i in the active set relative to the UE in question. At the time of the first iteration, this involves placing in the active set the cell for which the measurement CPICH_Ec/N0(0) is maximal. In the following step 73, the integer k is increased by the number $\alpha_i$ of propagation paths of the physical channel of cell i for which a reception energy greater than a determined threshold has been detected by the UE. This number $\alpha_i$ is supplied directly by the UE or deduced by the RNC from the measurements $\lambda_{i,j}$, $\mu_{i,j}$ or $\rho_{i,j}$ uploaded by the UE.

The integer k is then compared with a parameter M in test 74. If k≥M, the RNC estimates that a sufficient number of energetic paths is already covered by the cells of the active set such that it disables insertion of new cells by leaving the loop 72-76. If k<M, the integer i is incremented by one unit in step 75, then an admission criterion is examined in step 76. In the example in FIG. 8, examining the criterion 76 consists in comparing the difference CPICH_Ec/N0(0)−CPICH_Ec/N0(i) with a positive admission threshold Sa which may be an increasing function of the number k of paths already taken into consideration (or the number i of cells already placed in the active set). The algorithm admits the cell i into the active set by returning to step 72 when CPICH_Ec/N0(0)−CPICH_Ec/N0(i)<Sa. Otherwise, the cell i and the subsequent cells of the monitored set do not satisfy the admission criterion, so execution of the algorithm ends.

The values of the thresholds Sa(k) and of the parameter M can be chosen by the operator when configuring the radio network. They can also be adaptive. The parameter M may also depend on the capabilities of the UE, particularly the number of fingers in the rake receiver, indicated to the RNC in the context of the RRC connection.

Naturally, a procedure such as that in FIG. 7 or 8 may relate to parameters other than the CIPCH_Ec/N0, for example the RSCPs and/or and SIRs. On the other hand, these procedures are only examples, given that a great diversity of insertion/deletion strategies for the active set may be applied by the RNC using the parameters representative of the energy distribution in the propagation profiles, such as the previously described $\alpha_i$, $\lambda_{i,j}$, $\mu_{i,j}$ or $\rho_{i,j}$.

In addition, other algorithms, depending on the same types of parameters representative of the energy distribution in the propagation profiles, may be used in the RNC, in particular to adjust the transmission power of the transceivers of the active set in relation to a mobile terminal, with a view to balancing the downlink power transmitted by those fixed transceivers (cf. section 5.2 of technical specification TS 25.214, "Physical Layer procedures (FDD)" version 3.6.0, published by the 3GPP in March 2001). The way in which the RNC controls the Nodes B to supply them with the required balancing parameters is described in section 8.3.7 of technical specification 3G TS 25.433 aforementioned. The "Pref" parameter, invoked in said section, can be adjusted cell by cell to control the distribution of power over all the transceivers of the active set. Here again, many strategies of power control may appear.

As an example, in a case in which the active set comprises two fixed transceivers corresponding respectively to spreading codes with indices i=1 and i=2, the RNC has the numbers $\alpha_i$ of paths having a reception energy greater than a threshold, as well as the total number β of paths in question (β=$\alpha_1$+$\alpha_2$). It can moreover have communicated to it the attenuation ("pathloss" for each transceiver i by means of the "MEASUREMENT CONTROL" and "MEASUREMENT REPORT" messages of the RRC protocol. This attenuation parameter, in dB, is the difference between the transmission power on the primary CPICH by the transceiver i and the parameter CPICH_RSCP measured by the UE (see section 10.3.7.38 of technical specification 3G TS 25.331 aforementioned). The RNC may then fix the power balancing parameters according to these attenuations and the $\alpha_i$, for example in the following manner:

- if the attenuations and the $\alpha_i$ are similar between the two transceivers in question, the power is distributed equally between the two transmitters,
- if the $\alpha_i$ are similar whereas the attenuations are substantially different between the two transceivers in question, the power adjustment parameters are fixed so as to transmit more strongly from the best transceiver (the lowest pathloss). So, with $\alpha_1$=$\alpha_2$=3 and for a dissymmetry of 3 dB between the two attenuations, a simulation has shown that the power should be transmitted typically at 90% by the transceiver thus favored and at 10% by the other transceiver, which corresponds to a difference of approximately 10 dB on transmission. Another simulation based on the hypotheses $\alpha_1$=$\alpha_2$=2 and a dissymmetry of 3 dB between the two attenuations has given as typical values of power distribution between the two transceivers 75%, to the benefit of the favored transceiver, compared with 25% for the other transceiver,
- if the attenuations are similar but the $\alpha_i$ are substantially different between the two transceivers. in question, the power adjustment parameters are fixed to favor also transmission from the best transceiver (the highest $\alpha_i$),
- if the attenuations and the $\alpha_i$ are all dissimilar and lead to choosing the same "best" transceiver, the imbalance of power will then be further accentuated (at the limit by transmitting at zero power on the least good transceiver),
- if the attenuations and the $\alpha_i$ are both dissimilar and lead to opposite choices for the same "best" transceiver, adjustments can be applied that balance the transmission power or favor one or other of the two criteria.

In all cases, the variations in power to be applied may be determined in an empirical manner with the aid of simulations. We then obtain a conversion table giving the transmission power adjustment parameters to be sent to each of the transceivers according to the various attenuation values and $\alpha_i$ for each transceiver. Once constituted, this conversion table may be stored in the RNC 12. The latter may use it after analyzing the measurements uploaded to it in order to send to each transceiver the appropriate parameters for adjusting their transmission power.

Another use of parameters representative of the energy distribution in the propagation profiles is described below, although many other examples may be envisaged. It involves the determination of the physical channel or channels to be used for communication between a mobile terminal and a given fixed transceiver, as well as their format. As explained above, a communication channel has specific features according to its format. The various formats that exist are assembled in Table of section 5.3.2 of the aforementioned technical specification 3G TS 25.211. One of the important. features of a communication channel is its spread factor SF, as explained above. The higher a channel's SF, the lower the bit rate that it offers. But at the same time, the higher a channel's SF, the longer a symbol's duration, hence better resistance to interference, particularly between symbols.

Inter-symbol interference occurs when the time difference between the significant paths of the impulse response of the propagation channel exceeds the duration of a symbol, that is the duration of a chip multiplied by the SF.

As was described previously, the receiver can transmit to the radio network controller RNC a time indication for certain paths which may be used to characterize the distribution over time of the paths detected by the receiver during the duration of a symbol. It may also transmit relative information giving for example the time separating two given paths, for example the two highest energy paths, over a reception period. In all cases, the RNC, at the time of the processing of the messages sent by the mobile terminal or by the fixed transceiver, can extract from them a duration between two propagation paths, particularly the maximum time difference between the paths signaled. It then compares this duration with that of a symbol over the current communication channels. On the basis of this comparison, the RNC can decide to choose to modify the current communication channels and replace them with one or more communication channels with different SFs. A similar process may also be carried out, not during a communication, but upon its initialization, when the radio resources are allocated.

To illustrate this general principle, let us consider a communication channel with SF 8 used at a given moment between a mobile terminal and a fixed transceiver. For example, this is a number 15 format channel according to the coding in technical specification 3G TS 25.211. According to the above table 11, the channel can. transport 128+488=608 data bits in a time slot. The duration of a symbol over this channel is approximately 2 µs. If the measurements uploaded to the RNC show that the highest energy echoes are more than 2 µs apart (the difference in length of the corresponding paths is greater than approximately 600 m), the RNC knows that inter-symbol interference (ISI) will occur. To counter this interference, while ensuring the required service, the RNC may choose to use, by replacing this communication channel with two other channels of SF 16, for example of No. 14 format (multicode transmission). Communication is then also distributed between the two channels. These channels have a symbol duration of approximately 4 µs which severely restricts the ISI without the need to equip the receiver with a complex equalizer. The number of payload data bits on each of these channels is 56+232=288 bits, or 576 bits for both channels together. The resultant bit rate is therefore slightly less with the two SF 16 channels, which is due to the repetition of the bits of the DPCCH to the detriment of the information bits of the DPDCH. The difference in bit rate on the DPDCH is however reduced (by approximately 5%) and will not, in many cases, prevent the required service being offered.

The converse case is also interesting since it may be used to avoid transmitting in multicode when the RNC ascertains that the paths corresponding to the uploaded profile measurements are distributed over a shorter duration than the symbol time of a channel of half the SF. If the communication polls several channels of high SF, the number of rake receiver fingers used is that much higher and risks, in the case of a mobile terminal containing typically six fingers, leaving no fingers available particularly for listening to other fixed transmitters. It is therefore particularly advantageous in such a case to reconfigure the mobile terminal and transceiver concerned so that they use a single channel of lower SF, for example half, to transport their communication, thereby also increasing the communication bit rate.

Transmission by the RNC of the channels to be used by the mobile terminal is carried out according to the RRC protocol as explained in the aforementioned technical specification 3G TS 25.331, using a channel setup or reconfiguration command: "Radio bearer setup", "Radio bearer reconfiguration" or "Physical channel reconfiguration". Each of these messages contains an information element called "Downlink information for each radio link" (see paragraph 10.3.6.27 of 3G TS 25.331). This message itself contains an information element called "Downlink DPCH info for each RL" (see paragraph 10.3.6.1 of 3G TS 25.331). The latter message contains a number of information elements for characterizing the channels to be used. Among these information elements there are the downlink channel codes (values between 1 and <maxDPCH-DLchan>), the spread factors and the associated scrambling codes. On receipt of this message, the mobile terminal is capable of using the channel or channels identified and transmitted by the RNC.

According to the RRC protocol, the mobile terminal may also indicate to the RNC its capabilities in terms of downlink channel support. This is done using the "UE capability information" message (see paragraph 10.2.56 of 3G TS 25.331), containing an information element "UE radio access capability" (see paragraph 10.3.3.42 of 3G TS 25.331) pointing in turn to the "Physical channel capability" (see paragraph 10.3.3.25 of 3G TS 25.331). For example, it is via this channel that the mobile indicates to the RNC the number of physical channels it supports simultaneously. Thus the RNC bases its choice of channel allocation according to the effective capabilities of the mobile terminal.

Transmission by the RNC of the channels to be used by the fixed transceiver is carried out according to the NBAP protocol, as explained in the aforementioned technical specification 3G TS 25.433, using a channel setup or reconfiguration command: "Radio link set up request" or "Radio link reconfiguration prepare". Each of these messages contains an information element called "FDD DL code information" (see paragraph 9.2.214.a of 3G TS 25.433). The latter comprises a field called "FDD DL Code Information" containing, as previously, a list of channel codes to be used by the fixed transceiver from a list of values (from 1 to <maxDPCH-DLchan>), while making reference to the scrambling codes and to the associated spread factors.

It should be noted, in cases where several RNCs are involved in the communication, that the configuration command, that is the channel allocation command, can be sent to the transceiver by the DRNC, whereas it is always the SRNC that sends the configuration command to the mobile terminal.

The invention claimed is:

1. A method of controlling radio resources assigned for communication between a mobile terminal and a cellular radio infrastructure, the infrastructure comprising at least one radio network controller and at least one fixed transceiver, the method comprising:
   determining a distribution of energy over time for at least one communication channel representing multiple propagation paths of at the least one communication channel between the at least one fixed transceiver and a mobile station;
   transmitting information indicative of the distribution of energy over time for the at least one communication channel to the radio network controller;
   processing the information indicative of the distribution of energy over time for the at least one communication channel at the radio network controller to determine parameters to be used for the at least one communication channel between the at least one fixed transceiver and the mobile station, wherein the step of processing the information indicative of the distribution of energy over time for at the least one communication channel to determine parameters to be used for the at least one communication channel comprises processing the information indicative of the distribution of energy over time for the at least one communication channel to determine a format to be used for the at least one communication channel between the at least one fixed transceiver and the mobile station, wherein the format is defined by a dedicated physical data channel (DPDCH) bits per slot parameter, comprising bits per slot in a first data channel and bits per slot in a second data channel.

2. A method as defined in claim 1, wherein the distribution of energy over time for the at least one communication channel is a channel impulse response.

3. A method as defined in claim 1, wherein the format is further defined by at least one of the following parameters:
   channel bit rate;
   channel symbol rate:
   spreading factor;
   bits per slot;
   dedicated physical data channel (DPDCH) bits per slot;
   dedicated physical control channel (DPCCH) bits per slot; and
   transmitted slots per radio frame.

4. A method as defined in claim 3, wherein the format is further defined by all of the parameters listed in claim 3.

5. A method as defined in claim 3, wherein the at least one parameter is DPCCH bits per slot and comprises transmit power control (TPC) bits, transport format combination indicator (TFCI) bits and pilot bits per slot.

6. A method as defined in claim 1, further comprising processing the information indicative of the distribution of energy over time for the at least one communication channel to determine if the communication channel is to be split into at least two communication channels to be used between the at least one fixed transceiver and the mobile station.

7. A method as defined in claim 1, wherein:
   the step of determining a distribution of energy over time for at least one communication channel comprises determining distributions of energy over time for at least two channels representing multiple propagation paths between at least two fixed transceivers and the mobile station;
   the step of transmitting information indicative of the distribution of energy over time for the at least one communication channel to the radio network controller comprises transmitting information indicative of the distributions of energy over time for the at least two channels to the radio network controller; and
   the step of processing the information indicative of the at least one distribution of energy over time for the at least one communication channel at the radio network controller comprises processing the information indicative of the distributions of energy over time for the at least two channels to determine parameters for balancing transmission power settings for the at least two fixed transceivers.

8. A method as defined in claim 7, wherein the step of processing the information indicative of energy distributions for the at least two channels at the radio network controller comprises processing the information indicative of energy distributions for the at least two channels to determine a preferred active set of transceivers to be used for communication with the mobile station.

9. A radio network controller for a wireless communication system comprising at least one fixed transceiver, the radio network controller comprising:
   a receiver operable to receive a distribution of energy over time for at least one communication channel representing multiple propagation paths of at least one communication channel between the at least one fixed transceiver and a mobile station; and
   a processor operable to process the information indicative of the distribution of energy over time for the at least one communication channel at the radio network controller to determine parameters to be used for the at least one communication channel between the at least one fixed transceiver and the mobile station, wherein determining parameters to be used comprises determining a format to be used for the at least one communication channel between the at least one fixed transceiver and the mobile station, wherein the format is defined by at least one of the following parameters:
   channel bit rate;
   channel symbol rate:
   spreading factor;
   bits per slot;
   dedicated physical data channel (DPDCH) bits per slot;
   dedicated physical control channel (DPCCH) bits per slot, wherein DPCCH bits slot comprises transmit power control (TPC) bits, transport format combination indicator (TFCI) bits and pilot bits per slot and transmitted slots per radio frame.

10. A radio network controller as defined in claim 9, wherein the distribution of energy over time is a channel impulse response.

11. A radio network controller as defined in claim 9, wherein the processor is further operable to process the information indicative of the distribution of energy over time for the at least one communication channel to determine if the communication channel is to be split into at least two communication channels to be used between the at least one fixed transceiver and the mobile station.

12. A radio network controller as defined in claim 9, wherein:
   the receiver is operable to receive distributions of energy over time for at least two communication channels representing multiple propagation paths between at least two fixed transceivers and the mobile station; and
   the processor is operable to process the information indicative of the distributions of energy over time for the at least two communication channels to determine parameters for balancing transmission power settings for the at least two fixed transceivers.

13. A radio network controller as defined in claim 12, wherein the processor is operable to process the information indicative of energy distributions for the at least two communication channels to determine a preferred active set of transceivers to be used for communication with the mobile station.

14. A method of operating a radio network controller for a wireless communication system comprising at least one fixed transceiver, the method comprising:
receiving information indicative of a distribution of energy over time for at least one communication channel representing multiple propagation paths of at least one communication channel between the at least one fixed transceiver and a mobile station; and
processing the information indicative of the distribution of energy over time for the at least one communication channel at the radio network controller to determine parameters to be used for the at least one communication channel between the at least one fixed transceiver and the mobile station, wherein processing the information indicative of the distribution of energy over time for the at least one communication channel to determine parameters to be used for the at least one communication channel comprises processing the information indicative of the distribution of energy over time for the at least one communication channel of the communication channel to determine a format to be used for the at least one communication channel between the at least one fixed transceiver and the mobile station, wherein the format is defined by at least one of the following parameters:
channel bit rate;
channel symbol rate:
spreading factor;
bits per slot;
dedicated physical data channel (DPDCH) bits per slot, wherein the DPDCH bits per slot comprise bits per slot in a first data channel and bits per slot in a second data channel;
dedicated physical control channel (DPCCH) bits per slot; and
transmitted slots per radio frame.

15. A method as defined in claim 14, wherein the distribution of energy over time for the at least one communication channel is a channel impulse response.

16. A method as defined in claim 14, further comprising processing the information indicative of the distribution of energy over time for the at least one communication channel to determine if the communication channel is to be split into at least two communication channels to be used between the at least one fixed transceiver and the mobile station.

17. A method as defined in claim 14, wherein:
receiving information indicative of a distribution of energy over time for the at least one communication channel comprises receiving information indicative of distributions of energy over time for the at least two communication channels representing multiple propagation paths between at least two fixed transceivers and the mobile station; and
processing the information indicative of the at least one distribution of energy over time for the at least one communication channel comprises processing the information indicative of the distributions of energy over time for the at least two communication channels to determine parameters for balancing transmission power settings for the at least two fixed transceivers.

18. A method as defined in claim 17, comprising processing the information indicative of energy distributions for the at least two communication channels to determine a preferred active set of transceivers to be used for communication with the mobile station.

19. A mobile terminal for a wireless communication system, the mobile terminal comprising:
a receiver operable to receive signals from at least one fixed transceiver over at least one communication channel having multiple propagation paths;
a processor operable to determine a distribution of energy over time for the at least one communication channel; and
a transmitter operable to transmit information indicative of the at least one distribution of energy over time for the at least one communication channel to an infrastructure of the wireless communication system;
wherein the distribution of energy over time is usable to determine parameters to be used for the at least one communication channel, wherein determining parameters comprises determining a format to be used for the at least one communication channel between the at least one fixed transceiver and the mobile station, wherein the format is defined by at least one of the following parameters:
channel bit rate;
channel symbol rate:
spreading factor;
bits per slot;
dedicated physical data channel (DPDCH) bits per slot;
dedicated physical control channel (DPCCH) bits per slot, wherein DPCCH bits slot comprises transmit power control (TPC) bits, transport format combination indicator (TFCI) bits and pilot bits per slot and transmitted slots per radio frame.

20. A mobile terminal as defined in claim 19, wherein the distribution of energy over time for the at least one communication channel is a channel impulse response.

21. A mobile terminal as defined in claim 19, wherein:
the receiver is operable to receive signals from at least two fixed transceivers;
the processor is operable to determine distributions of energy over time for at least two communication channels representing multiple propagation paths between the at least two fixed transceivers and the mobile station; and
the transmitter is operable to transmit information indicative of the at least two distributions of energy over time for the at least two communication channels to the infrastructure of the wireless communication system.

22. A method of operating a mobile terminal for a wireless communication system, the method comprising:
receiving signals from at least one fixed transceiver over at least one communication channel having multiple propagation paths;
determining a distribution of energy over time for the at least one communication channel; and
transmitting information indicative of the at least one distribution of energy over time for the at least one communication channel to an infrastructure of the wireless communication system;
wherein the distribution of energy over time is usable to determine parameters to be used for the at least one communication channel, wherein determining parameters comprises determining a format to be used for the at least one communication channel between the at least one fixed transceiver and the mobile station, wherein the format is defined by at least one of the following parameters:
channel bit rate;
channel symbol rate:
spreading factor;
bits per slot;
dedicated physical data channel (DPDCH) bits per slot, wherein the DPDCH bits per slot comprise bits per slot in a first data channel and bits per slot in a second data channel;
dedicated physical control channel (DPCCH) bits per slot; and
transmitted slots per radio frame.

23. A method as defined in claim 22, wherein the distribution of energy over time for the at least one communication channel is a channel impulse response.

24. A method as defined in claim 22, comprising:
receiving signals from at least two fixed transceivers;
determining distributions of energy over time for at least two communication channels representing multiple propagation paths between the at least two fixed transceivers and the mobile station; and
transmitting information indicative of the at least two distributions of energy over time for the at least two communication channels to the infrastructure of the wireless communication system.

25. A method of controlling radio resources assigned for communication between a mobile terminal and a cellular radio infrastructure, the infrastructure comprising at least one radio network controller and at least one fixed transceiver, the method comprising:
determining a distribution of energy over time for at least one communication channel representing multiple propagation paths of at the least one communication channel between the at least one fixed transceiver and a mobile station;
transmitting information indicative of the distribution of energy over time for the at least one communication channel to the radio network controller;
processing the information indicative of the distribution of energy over time for the at least one communication channel at the radio network controller to determine parameters to be used for the at least one communication channel between the at least one fixed transceiver and the mobile station, wherein the step of processing the information indicative of the distribution of energy over time for at the least one communication channel to determine parameters to be used for the at least one communication channel comprises processing the information indicative of the distribution of energy over time for the at least one communication channel to determine a format to be used for the at least one communication channel between the at least one fixed transceiver and the mobile station wherein the format is defined by the following parameters:
channel bit rate;
channel symbol rate:
spreading factor;
bits per slot;
dedicated physical data channel (DPDCH) bits per slot;
dedicated physical control channel (DPCCH) bits per slot; and
transmitted slots per radio frame.

26. A method of controlling radio resources assigned for communication between a mobile terminal and a cellular radio infrastructure, the infrastructure comprising at least one radio network controller and at least one fixed transceiver, the method comprising:
determining a distribution of energy over time for at least one communication channel representing multiple propagation paths of at the least one communication channel between the at least one fixed transceiver and a mobile station;
transmitting information indicative of the distribution of energy over time for the at least one communication channel to the radio network controller;
processing the information indicative of the distribution of energy over time for the at least one communication channel at the radio network controller to determine parameters to be used for the at least one communication channel between the at least one fixed transceiver and the mobile station, wherein the step of processing the information indicative of the distribution of energy over time for at the least one communication channel to determine parameters to be used for the at least one communication channel comprises processing the information indicative of the distribution of energy over time for the at least one communication channel to determine a format to be used for the at least one communication channel between the at least one fixed transceiver and the mobile station, wherein the format is defined by a dedicated physical control channel (DPCCH) bits per slot parameter, comprising transmit power control (TPC) bits, transport format combination indicator (TFCI) bits and pilot bits per slot.

27. A radio network controller for a wireless communication system comprising at least one fixed transceiver, the radio network controller comprising:
a receiver operable to receive a distribution of energy over time for at least one communication channel representing multiple propagation paths of at least one communication channel between the at least one fixed transceiver and a mobile station; and
a processor operable to process the information indicative of the distribution of energy over time for the at least one communication channel at the radio network controller to determine parameters to be used for the at least one communication channel between the at least one fixed transceiver and the mobile station, wherein determining parameters to be used comprises determining a format to be used for the at least one communication channel between the at least one fixed transceiver and the mobile station, wherein the format is defined by the following parameters:
channel bit rate;
channel symbol rate:
spreading factor;
bits per slot;
dedicated physical data channel (DPDCH) bits per slot;
dedicated physical control channel (DPCCH) bits per slot; and
transmitted slots per radio frame.

28. A radio network controller for a wireless communication system comprising at least one fixed transceiver, the radio network controller comprising:
a receiver operable to receive a distribution of energy over time for at least one communication channel representing multiple propagation paths of at least one communication channel between the at least one fixed transceiver and a mobile station; and
a processor operable to process the information indicative of the distribution of energy over time for the at least one communication channel at the radio network controller to determine parameters to be used for the at least one communication channel between the at least one fixed transceiver and the mobile station, wherein determining parameters to be used comprises determining a format to be used for the at least one communication channel between the at least one fixed transceiver and the mobile station, wherein the format is defined by at least one of the following parameters:
channel bit rate;
channel symbol rate:
spreading factor;
bits per slot;
dedicated physical data channel (DPDCH) bits per slot, wherein the DPDCH bits per slot comprise bits per slot in a first data channel and bits per slot in a second data channel;
dedicated physical control channel (DPCCH) bits per slot; and
transmitted slots per radio frame.

29. A method of operating a radio network controller for a wireless communication system comprising at least one fixed transceiver, the method comprising:
receiving information indicative of a distribution of energy over time for at least one communication channel representing multiple propagation paths of at least one communication channel between the at least one fixed transceiver and a mobile station; and
processing the information indicative of the distribution of energy over time for the at least one communication channel at the radio network controller to determine parameters to be used for the at least one communication channel between the at least one fixed transceiver and the mobile station, wherein processing the information indicative of the distribution of energy over time for the at least one communication channel to determine parameters to be used for the at least one communication channel comprises processing the information indicative of the distribution of energy over time for the at least one communication channel of the communication channel to determine a format to be used for the at least one communication channel between the at least one fixed transceiver and the mobile station, wherein the format is defined by at the following parameters:
channel bit rate;
channel symbol rate:
spreading factor;
bits per slot;
dedicated physical data channel (DPDCH) bits per slot;
dedicated physical control channel (DPCCH) bits per slot; and
transmitted slots per radio frame.

30. A method of operating a radio network controller for a wireless communication system comprising at least one fixed transceiver, the method comprising:
receiving information indicative of a distribution of energy over time for at least one communication channel representing multiple propagation paths of at least one communication channel between the at least one fixed transceiver and a mobile station; and
processing the information indicative of the distribution of energy over time for the at least one communication channel at the radio network controller to determine parameters to be used for the at least one communication channel between the at least one fixed transceiver and the mobile station, wherein processing the information indicative of the distribution of energy over time for the at least one communication channel to determine parameters to be used for the at least one communication channel comprises processing the information indicative of the distribution of energy over time for the at least one communication channel of the communication channel to determine a format to be used for the at least one communication channel between the at least one fixed transceiver and the mobile station, wherein the format is defined by at least one of the following parameters:
channel bit rate;
channel symbol rate:
spreading factor;
bits per slot;
dedicated physical data channel (DPDCH) bits per slot;
dedicated physical control channel (DPCCH) bits per slot, wherein the DPCCH bits per slot comprise transmit power control (TPC) bits, transport format combination indicator (TFCI) bits and pilot bits per slot; and
transmitted slots per radio frame.

31. A mobile terminal for a wireless communication system, the mobile terminal comprising:
a receiver operable to receive signals from at least one fixed transceiver over at least one communication channel having multiple propagation paths;
a processor operable to determine a distribution of energy over time for the at least one communication channel; and
a transmitter operable to transmit information indicative of the at least one distribution of energy over time for the at least one communication channel to an infrastructure of the wireless communication system;
wherein the distribution of energy over time is usable to determine parameters to be used for the at least one communication channel, wherein determining parameters comprises determining a format to be used for the at least one communication channel between the at least one fixed transceiver and the mobile station, wherein the format is defined by at least one of the following parameters:
channel bit rate;
channel symbol rate:
spreading factor;
bits per slot;
dedicated physical data channel (DPDCH) bits per slot, wherein the DPDCH bits per slot comprise bits per slot in a first data channel and bits per slot in a second data channel;
dedicated physical control channel (DPCCH) bits per slot; and
transmitted slots per radio frame.

32. A method of operating a mobile terminal for a wireless communication system, the method comprising:
receiving signals from at least one fixed transceiver over at least one communication channel having multiple propagation paths;
determining a distribution of energy over time for the at least one communication channel; and
transmitting information indicative of the at least one distribution of energy over time for the at least one communication channel to an infrastructure of the wireless communication system;
wherein the distribution of energy over time is usable to determine parameters to be used for the at least one communication channel, wherein determining parameters comprises determining a format to be used for the at least one communication channel between the at least one fixed transceiver and the mobile station, wherein the format is defined by at least one of the following parameters:
channel bit rate;
channel symbol rate:
spreading factor;
bits per slot;
dedicated physical data channel (DPDCH) bits per slot;
dedicated physical control channel (DPCCH) bits per slot, wherein DPCCH bits slot comprises transmit power control (TPC) bits, transport format combination indicator (TFCI) bits and pilot bits per slot; and
transmitted slots per radio frame.

* * * * *